Figure 4:
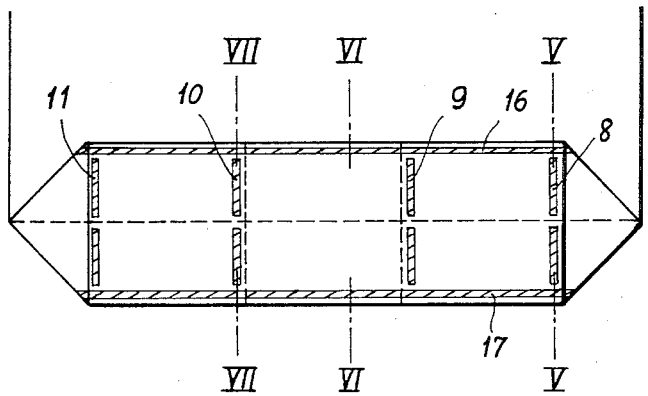

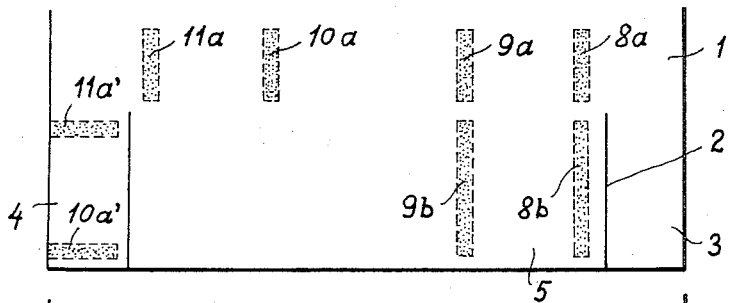
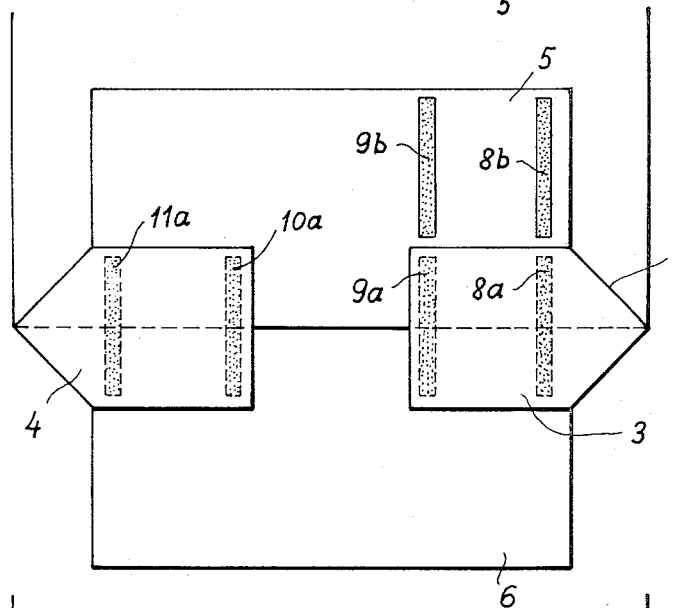
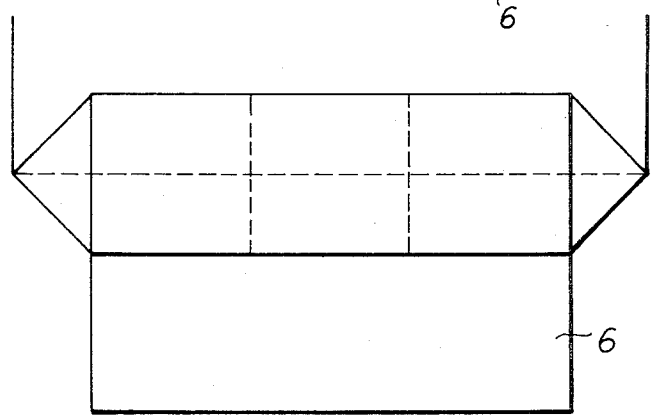

Sept. 26, 1967     K. G. NIELSEN ETAL     3,343,463
METHOD OF FORMING A CROSS BOTTOM AT THE END OF A FLAT TUBULAR
BLANK OF HEAT SEALABLE MATERIAL AND BAG
HAVING A CROSS BOTTOM SO MADE
Filed Feb. 11, 1964                       4 Sheets-Sheet 3

INVENTORS
Kurt G. Nielsen
Svend A. Jensen
BY
Watson, Cole, Grindle & Watson
ATTORNEYS

United States Patent Office 3,343,463
Patented Sept. 26, 1967

3,343,463
METHOD OF FORMING A CROSS BOTTOM AT THE END OF A FLAT TUBULAR BLANK OF HEAT SEALABLE MATERIAL AND BAG HAVING A CROSS BOTTOM SO MADE
Kurt Georg Nielsen, Lille Varlose, and Svend Aage Jensen, Bagsvard, Denmark, assignors to Ingeniorfirmaet Elwis, Copenhagen, Denmark, a partnership
Filed Feb. 11, 1964, Ser. No. 344,126
Claims priority, application Denmark, Feb. 15, 1963, 726/63
12 Claims. (Cl. 93—35)

This invention relates to a method of forming a cross bottom at the end of a flat tubular blank of heat sealable material, such as artificial resins and similar thermoplastic materials, and also to a bag having a cross bottom so made at least at one end thereof.

Up to now, most bags made from plastics have been in the form of flat bags closed at their ends by means of transverse sealing seams. However, this form of bag is inconvenient from the point of view of stacking and transportation, and the ends of the transverse seams forming the corners of the bag are delicate spots when injury is likely to occur during handling and transportation. Finally, if bags of this type are to be constructed with a valve, this has to be added in a separate operation, and does not fit in too well with the general pattern of such bags.

Attempts have also been made at producing cross bottom bags from plastics, but so far it has only been possible to make such bags in special forms rather different from and less advantageous and adaptable than the conventional form of paper cross bottom bags, and the methods resorted to have been rather complicated and have resulted in the formation of finlike sealing seams protruding from the bottoms of the bags, said seams being formed by the sealing together of outwardly turned lips of the sheet portions forming the bottom of the bag.

It is the object of the invention to devise a method by means of which a bag of heat sealable material can be made in a simple manner in substantially the same form as the conevntional cross bottom paper bags, either with or without a valve, and in such a manner that all connections between the various parts forming the bottom of the bag are in the form of overlap sealing seams in the plane of the bottom.

To this end, a cross bottom pattern of the type conventional in paper bags is first formed at the end of a flat tubular blank of heat sealable material by means of corner flaps folded along diagonal lines and bottom flaps folded along lines extending longitudinally of the bottom end of the blank, and then, according to the invention, the said corner and bottom flaps are clamped together with the adjoining end portions of the side walls of the blank between exteriorly applied heat sealing tools along lines extending transversely across the bottom, thereby to form transverse sealing seams, a seal preventing agent such as silicone oil being beforehand applied to the areas of at least one of the surfaces of the corner flaps and the side walls to be clamped against one another in the transverse heat sealing operation.

As will be seen, the salient feature of this method is that it becomes possible to make plane, non-protruding sealing seams in the bottom area by applying the counter pressure necessary in the heat sealing operation from the outside through the wall of the blank in spite of the fact that this must not be sealed to the flaps forming the bottom because it would then be impossible to properly erect the bag.

Similarly, according to the invention, where the cross bottom to be formed is of the type having a valve flap formed by one of the corner flaps, a seal preventing agent is also applied to the areas of at least one of the surfaces of the valve flap and the bottom flaps to be clamped against one another in the transverse heat sealing operation, so that the heat sealing counter pressure may also be transferred through the valve flap in spite of the fact that this must not be sealed neither to the wall of the blank nor to the bottom flaps.

Figure 5:
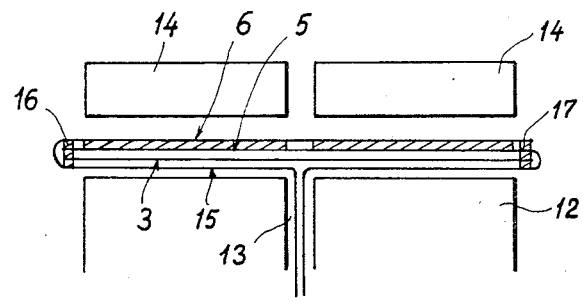
Figure 6:
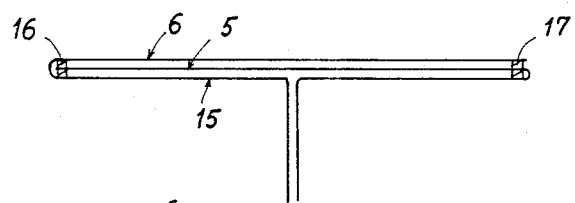
Figure 7:
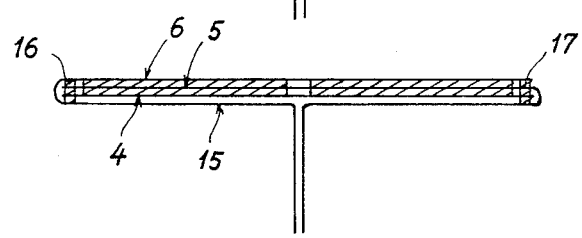
Figure 8:
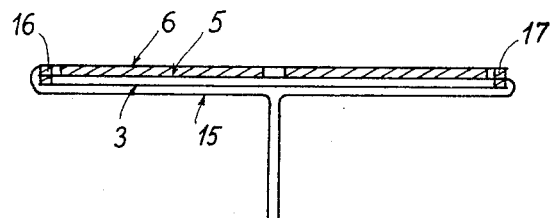
Figure 9:
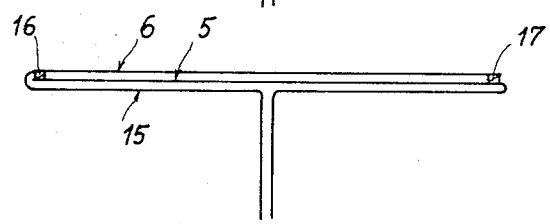
Figure 10:
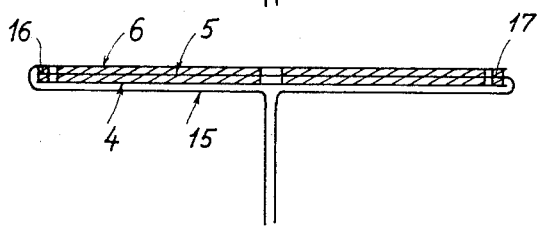
Figure 11:
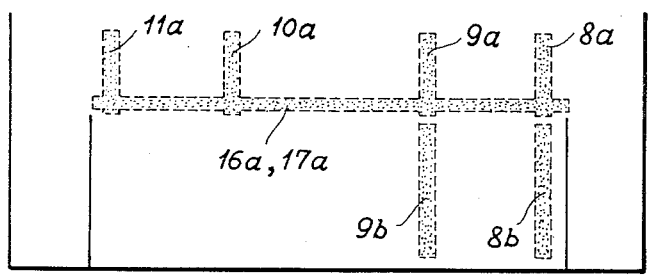
Figure 12:
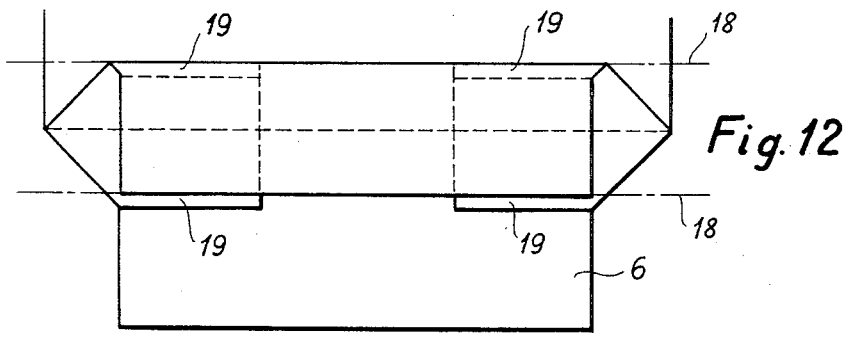
Figure 13:
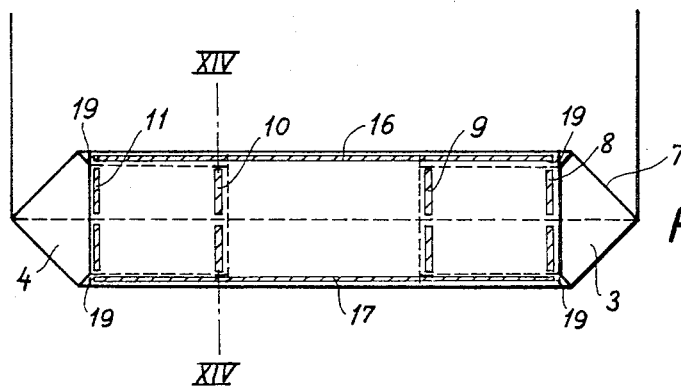
Figure 14:
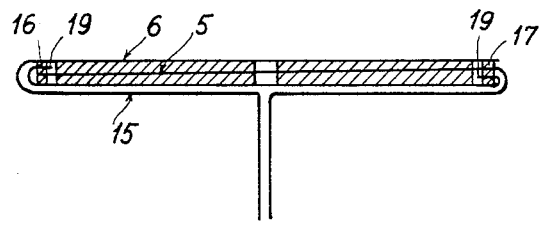
Figure 15:
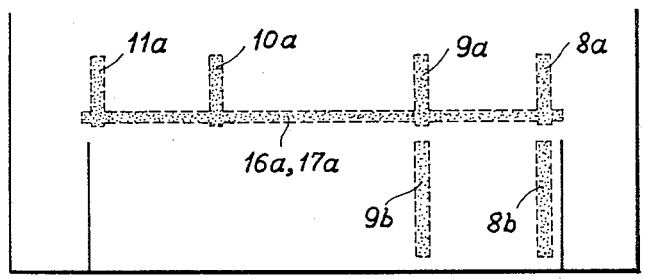

Further features of the invention will be understood from the following detailed description with reference to the accompanying drawings in which:

FIGS. 1–3 illustrate three different stages in the process of forming a cross bottom by the method according to the invention, FIG. 4 the finished cross bottom as folded against one side wall of the blank, as viewed from the bottom with indication of the lines along which sealing has been effected, FIG. 5 on a larger scale a section along the line V—V in FIG. 4 with indication of the sealing seams and diagrammatic illustration of the tools by means of which the sealing is performed, FIGS. 6 and 7 corresponding sections along the lines VI—VI and VII—VII in FIG. 4, however with omission of the sealing tools, FIGS. 8, 9 and 10 sections corresponding to FIGS. 5, 6 and 7 through a second embodiment, FIG. 11 the blank corresponding to FIGS. 8, 9 and 10 with indication of the areas where a seal preventing agent has to be applied, FIG. 12 an illustration corresponding to FIG. 3 of a third embodiment, FIG. 13 an illustration corresponding to FIG. 4 of the last mentioned embodiment, FIG. 14 a cross section along the line XIV—XIV in FIG. 13, and FIG. 15 the blank corresponding to FIGS. 12–14 with indication of the areas where a seal presenting agent has to be applied.

In FIGS. 1–4, 1 is a flat tubular blank of heat sealable material at the end of which a cross bottom is to be formed.

From the end of the blank, slits 2 are cut parallel to the marginal edges of the blank, whereby the end of the blank is subdivided into two corner flaps 3 and 4 along the edges, and two bottom flaps 5 and 6 in the middle. The slits 2 have a length equal to twice their distance from the edges of the blank.

As illustrated in FIG. 2, the corner flaps 3 and 4 are folded inwards towards the middle of the blank along diagonal folding lines 7, while at the same time the bottom flaps 5 and 6 are spread apart. One bottom flap 5 is thereafter folded against the corner flaps 3 and 4, as illustrated in FIG. 3, and finally the bottom flap 6 is folded against the bottom flap 5.

By the operations described, the end of the blank has been formed into a cross bottom, and the blank is then conveyed to a sealing station where the flaps are heat sealed to each other so as to form transverse sealing seams 8, 9, 10 and 11, see FIG. 4.

During the sealing operation, the cross bottom may, as diagrammatically illustrated in FIG. 5, rest on a support 12 having a slit 13 for receiving the body of the blank, and the sealing may be performed by means of sealing dies 14 pressing the whole of the cross bottom against the support 12. In the example illustrated, two sealing dies are used for each transverse sealing seam, each sealing die having a length slightly smaller than one half of the width of the cross bottom, so that seams are produced which are discontinued a short distance from the marginal edges of the cross bottom and in a narrow zone in the middle. In this manner, a particularly strong sealing is obtained, but a satisfactory solution may also be obtained by using sealing dies extending the whole way across the cross bottom and slightly beyond its marginal edges. Preferably, all four transverse sealing seams may be made simultaneously in this manner. Between the layers not to be sealed to each other, a seal preventing agent such as silicone oil has beforehand been applied.

As is apparent from FIG. 5, the sealing seam 8 only connects the two bottom flaps 5 and 6 with one another.

The same applies to the sealing seam 9.

On the other hand, as is apparent from FIG. 7, the sealing seams 10 and 11 connect both the corner flap 4 and the two bottom flaps 5 and 6 with one another, but does not connect the corner flap 4 with the adjoining portions 15 of the sides of the blank, whereby erection of the cross bottom would become impossible.

As will be apparent from the above description, the corner flap 3 at the right hand end of the cross bottom in FIG. 4 will form a valve flap in the manner conventional in paper bags, while a closure is made at the left hand end of the cross bottom.

If the cross bottom is not to be a valve bottom, all the transverse sealing seams are made in the manner illustrated in FIG. 7.

After the transverse sealing seams have been made, all the layers are connected with each other by longitudinal sealing seams 16 and 17 along the marginal edges of the cross bottom.

The seal preventing agent may be applied at any time before the transverse heat sealing operation.

Thus, the original flat blank may be opened up, e.g. by a blast of air, before or after slitting, and seal preventing agent may then be applied to the required areas of the inner faces of the blank, such as by means of brushes, wicks or spray nozzles. The said areas are indicated in FIG. 1 by the reference characters 8a/b, 9a/b, 10a and 11a corresponding to the sealing seams 8, 9, 10 and 11, respectively. It will be realized that in the areas 8a, 9a, 10a and 11a seal preventing agent should be applied to both inner faces of the blank, while in the areas 8b and 9b seal preventing agent should only be applied to the inner face of the bottom flap to be folded in first.

It will also be realized that instead of or in addition to the areas 10a and 11a, the areas 10a' and 11a' might be used for application of the seal preventing agent.

Alternatively, the application of the seal preventing agent may be porformed after the blank has reached the stage illustrated in FIG. 2. It will be seen that if the flaps 3 and 4 are folded back along transverse lines substantially coinciding with the ends of the bottom flaps, all the required areas are laid bare and will be located along four parallel lines so that the application may take place by moving four brushes or wicks or spray nozzles along these four lines. A further possibility would be to apply the seal preventing agent to the inner faces of the folded-back corner flaps and also the outer face of the corner flap 3 after this has again been folded inwards.

The embodiment illustrated in FIGS. 8–11 differs from that illustrated in FIGS. 1–7 in that the blank wall 1 is not sealed to the corner and bottom flaps in the longitudinal sealing seams 16 and 17. This may be obtained by additionally applying seal preventing agent to both inner faces of the blank in the area 16a, 17a in FIG. 11. A cross bottom of this type, when erected, will have more rounded and therefore stronger lateral edges, but on the other hand some leakage is inevitable, and a bag of this type should therefore be used for granular material only.

FIGS. 12–15 illustrate how the leakage of a cross bottom of the type illustrated in FIGS. 8–11 may be reduced by folding the bottom flaps 5 and 6 along folding lines intersecting the corner flaps 3 and 4 at a small distance from the marginal edges thereof, so that narrow areas 19 of the corner flaps are folded in together with the bottom flaps. In this case, the slits 2 will of course have to be cut correspondingly shorter than in FIG. 1.

We claim:
1. A method of forming a cross bottom at the end of a flat tubular blank of heat sealable material by means of corner flaps folded along diagonal lines and bottom flaps folded along lines extending longitudinally of the bottom end of the blank, characterized by the step of clamping the said corner and bottom flaps together with the adjoining end portions of the side wall of the blank between exteriorly applied heat sealing tools along lines extending transversely across the cross bottom, thereby to form transverse sealing seams, a seal preventing agent such as silicone being beforehand applied to the areas of at least one of the surfaces of the corner flaps and the side wall to be clamped against one another in the transverse heat sealing operation.

2. A method as in claim 1, where the cross bottom to be formed is of the type having a valve flap formed by one of the corner flaps, characterized in that a seal preventing agent is also applied to the areas of at least one of the surfaces of the valve flap and the bottom flaps to be clamped against one another in the transverse heat sealing operation.

3. A method as in claim 1, comprising the further step of clamping said corner and bottom flaps together with the adjoining end portions of the side walls of the blank between exteriorly applied heat sealing tools along lines extending longitudinally of the cross bottom along the marginal edges thereof, thereby to form longitudinal sealing seams.

4. A method as in claim 3, in which a seal preventing agent is beforehand applied to the areas of at least one of the surfaces of the end portions of the side walls of the blank and the adjoining flap portions to be clamped against one another in the longitudinal heat sealing operation.

5. A method as in claim 4 in which the bottom flaps are folded along lines intersecting the folded-in corner flaps at a small distance from the marginal edges thereof, thereby at the same time folding-in small marginal areas of the corner flaps together with the bottom flaps.

6. A method as in claim 1 in which the transverse sealing operation is carried out in such a manner that the sealing seams formed are discontinued at a small distance from the marginal edges of the cross bottom and in a narrow zone in the middle of the cross bottom.

7. A method for forming a cross bottom at the end of a flat tubular blank of heat sealable material, comprising the steps of cutting two longitudinal slits in both sidewalls of said blank from the end thereof at equal distances from one and the other longitudinal edge of the blank respectively, thereby to form a doubled up corner flap between each of said slits and the respective longitudinal edge of the blank and an end flap in each side wall of the blank between the two slits therein, folding said corner flaps towards the middle of said blank along diagonal folding lines extending from the ends of said slits to the respective longitudinal edges of the blank, thereby at the same time flattening each corner flap out in a single plane, applying a seal preventing agent to areas of the blank to form areas of contact between said corner flaps and the adjoining end portions of the side walls of the blank along lines extending transversely of said corner flaps in the folded-in positions thereof, folding said bottom flaps against said corner flaps and side wall end portions, and clamping said end portions, corner flaps and bottom flaps between heat sealing tools along sealing lines coinciding with said transversely extending lines, thereby to form transverse sealing seams.

8. A method of forming a valve cross bottom at the end of a flat tubular blank of heat sealable material, comprising the steps of cutting two longitudinal slits in both side walls of the blank from the end thereof at equal distances from one and the other longitudinal edge of the blank respectively, thereby to form a doubled-up corner flap between each of said slits and the respective longitudinal edge of the blank, and an end flap in each side wall of the blank between the two slits therein, folding said corner flaps towards the middle of said blank along diagonal folding lines extending from the ends of said slits to the respective longitudinal edges of the blank, thereby at the same time flattening each corner flap out in a single plane, applying a seal preventing agent to areas of the blank to form areas of contact between said corner flaps and the adjoining end portions of the side walls of the blank along lines extending transversely of said corner flaps in the folded-in position thereof, and also to areas of the blank to form areas of contact along the same transversely extending lines between one corner flap and said end flaps in the folded-in position of the latter, folding said bottom flaps against said corner flaps and side wall end portions, clamping said side wall end portions, corner flaps and bottom flaps between heat sealing tools along sealing lines coinciding with said transversely extending lines, thereby to form transverse sealing seams.

9. A method of forming a cross bottom at the end of a flat tubular blank of heat sealable material, comprising the steps of cutting two longitudinal slits in both sidewalls of said blank from the end thereof at equal distances from one and the other longitudinal edge of the blank respectively, thereby to form a doubled-up corner flap between each of said slits and the respective longitudinal edge of the blank and an end flap in each side wall of the blank between the two slits therein, folding said corner flaps towards the middle of said blank along diagonal folding lines extending from the ends of said slits to the respective longitudinal edges of the blank, thereby at the same time flattening each corner flap out in a single plane, applying a seal preventing agent to areas of the blank to form areas of contact between said corner flaps and the adjoining end portions of the side walls of the blank along lines extending transversely of said corner flaps in the folded-in positions thereof, folding said bottom flaps against said corner flaps and side wall end portions, and clamping said end portions, corner flaps and bottom flaps between heat sealing tools along sealing lines coinciding with said transversely extending lines, thereby to form transverse sealing seams, and also clamping said side wall end portions, corner flaps and bottom flaps between heat sealing tools along longitudinal sealing lines extending along the margins of said folded-in bottom flaps, thereby to form longitudinal sealing seams.

10. A method of forming a valve cross bottom at the end of a flat tubular blank of heat sealable material, comprising the steps of cutting two longitudinal slits in both side walls of the blank from the end thereof at equal distances from one and the other longitudinal edge of the blank respectively, thereby to form a doubled-up corner flap between each of said slits and the respective longitudinal edge of the blank, and an end flap in each side wall of the blank between the two slits therein, folding said corner flaps towards the middle of said blank along diagonal folding lines extending from the ends of said slits to the respective longitudinal edges of the blank, thereby at the same time flattening each corner flap out in a single plane, applying a seal preventing agent to areas of the blank to form areas of contact between said corner flaps and the adjoining end portions of the side walls of the blank along lines extending transversely of said corner flaps in the folded-in position thereof, and also to areas of the blank to form areas of contact along the same transversely extending lines between one corner flap and said end flaps in the folded-in position of the latter, folding said bottom flaps against said corner flaps and side wall end portions, clamping said end portions, corner flaps and bottom flaps between heat sealing tools along sealing lines coinciding with said transversely extending lines, thereby to form transverse sealing seams, and also clamping said side wall end portions, corner flaps and bottom flaps between heat sealing tools along longitudinal sealing lines extending along the margins of said folded-in bottom flaps, thereby to form longitudinal sealing seams.

11. A method of forming a cross bottom at the end of a flat tubular blank of heat sealable material, comprising the steps of cutting two longitudinal slits in both side walls of the blank from the end thereof at equal distances from one end and the other longitudinal edge of the blank respectively, thereby to form a doubled-up corner flap between each of said slits and the respective longitudinal edges of the blank, and an end flap in each side wall of the blank between the two slits therein, folding said corner flaps towards the middle of said blank along diagonal folding lines extending from the ends of said slits to the respective longitudinal edges of the blank, thereby at the same time flattening each corner flap out in a single plane, applying a seal preventing agent to areas of said blank to form areas of contact between said corner flaps and the adjoining end portions of the side walls of the blank along lines extending transversely of said corner flaps in the folded-in position thereof, and also to areas of the blank to form areas of contact along the same transversely extending lines between one corner flap and said end flaps in the folded-in position of the latter, and additionally to areas of the blank to form areas of contact between said side wall end portions and said bottom flaps along lines extending longitudinally of the bottom end of the blank adjacent the folding lines prescribed for said bottom flaps, folding said bottom flaps against said corner flaps and side wall end portions, clamping said end portions, corner flaps and bottom flaps between heat sealing tools along sealing lines coinciding with said transversely extending lines, thereby to produce transverse sealing seams, and also clamping said side wall end portions, corner flaps and bottom flaps between heat sealing tools along sealing lines coinciding with said longitudinal lines and extending along the margins of said folded-in bottom flaps, thereby to produce longitudial sealing seams.

12. A method as in claim 5 in which said bottom flaps are folded along lines intersecting the folded-in corner flaps at a small distance from the marginal edges thereof, thereby at the same time folding-in small marginal areas of the corner flaps together with the bottom flaps.

References Cited

UNITED STATES PATENTS

| 3,115,731 | 12/1963 | Blythe et al. | 156—538 X |
| 3,195,424 | 7/1965 | Camerini | 93—35 |
| 3,248,042 | 4/1966 | Kasting et al. | 229—59 X |

FOREIGN PATENTS 650,267  10/1962  Canada.

BERNARD STICKNEY, *Primary Examiner.*